Dec. 15, 1925.                                                                                                 1,566,238
                            J. E. SWENDEMAN
                               STEAM TRAP
                         Filed March 13, 1920                3 Sheets-Sheet 3
*Fig.4.*
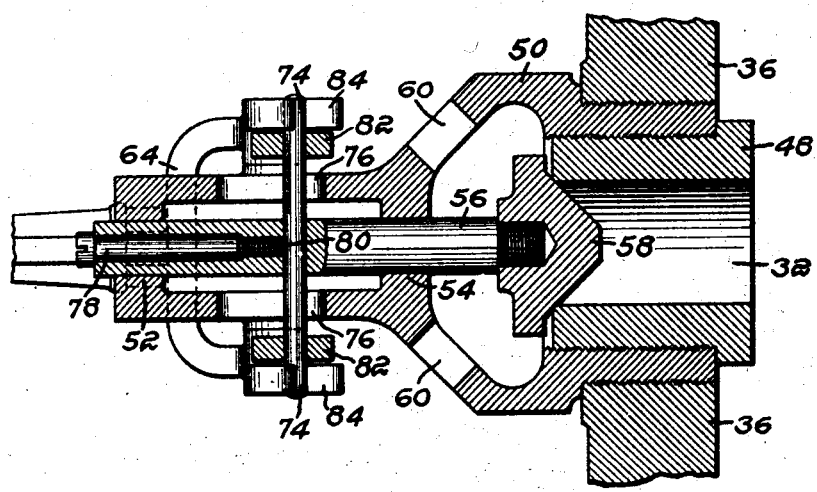
*Fig.5.*                    *Fig.6.*
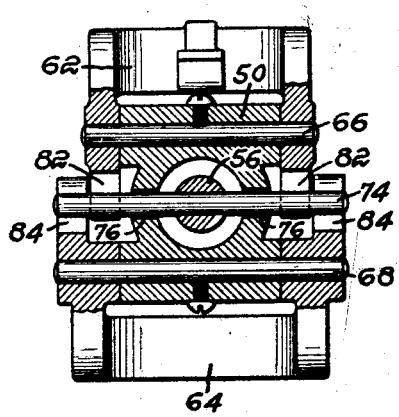 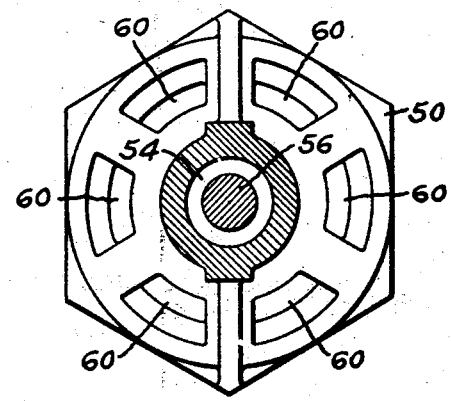
Inventor:
Joseph E. Swendeman,
Attys.

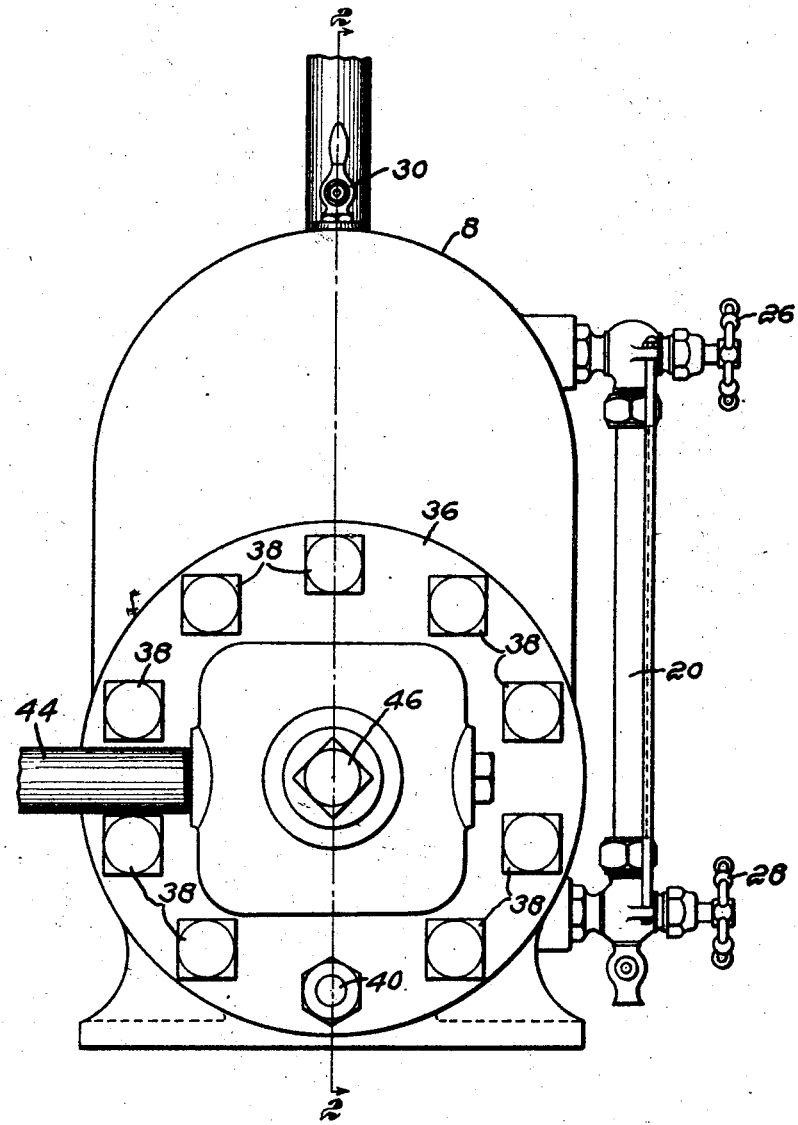

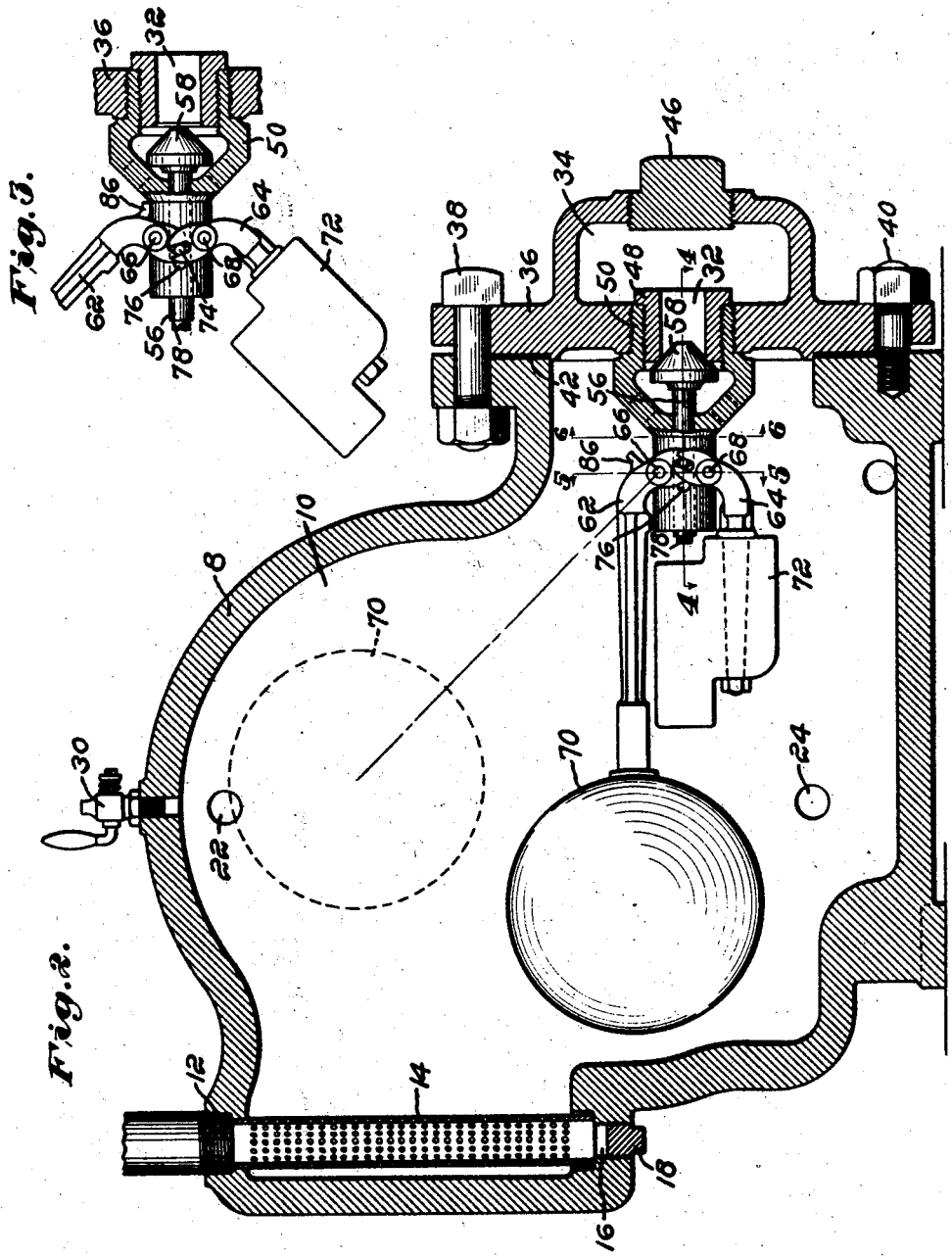

Patented Dec. 15, 1925.

1,566,238

UNITED STATES PATENT OFFICE.

JOSEPH E. SWENDEMAN, OF PHILADELPHIA, PENNSYLVANIA.

STEAM TRAP.

Application filed March 13, 1920. Serial No. 365,590.

*To all whom it may concern:*

Be it known that I, JOSEPH E. SWENDEMAN, a citizen of the United States, and a resident of Philadelphia, county of Philadelphia, and State of Pennsylvania, have invented an Improvement in Steam Traps, of which the following description, in connection with the accompanying drawing, is a specification, like characters on the drawings representing like parts.

This invention relates to steam traps of the class in which the outflow of the water of condensation is controlled by a float-operated valve, and the invention aims to improve the valve-operating mechanism and the means for the straining of the water and the removal of the sediment.

My invention will be best understood by reference to the following description, when taken in connection with the accompanying drawings of a preferred steam trap exemplifying my invention, while its scope will be more particularly pointed out in the appended claims.

In the drawings:

Fig. 1 is an end elevation of a steam trap exemplifying my invention;

Fig. 2 is a sectional view on line 2—2 of Fig. 1;

Fig 3 is an elevation, partly in section, illustrating the valve-operating mechanism and the valve when the latter is fully opened;

Fig. 4 is a sectional view on an enlarged scale on line 4—4 of Fig. 2;

Fig. 5 is a sectional view on an enlarged scale on line 5—5 of Fig. 2; and

Fig. 6 is a sectional view on an enlarged scale on line 6—6 of Fig. 2.

Referring to the drawings, and the embodiment of my invention which I have selected for exemplification, I have shown a steam trap comprising a casing 8 having a float chamber 10 provided with an inlet 12 for the water condensation from the steam system to which the trap is to be connected. A novel feature of my invention is a strainer, herein a perforated tube 14, one end of which communicates with the inlet 12, while the other communicates with a sediment outlet 16, the latter being normally closed by an appropriate closure, herein a threaded plug 18, screwed into the casing.

Preferably, the strainer is placed in an upright position. The openings in the strainer provide a way of communication between the interior of the latter and the float chamber 10. Hence, foreign matter which enters the inlet is deposited within the strainer, while the water flows into the float chamber. By simply removing the plug 18, the accumulation of foreign matter can be flushed out by the stream of water entering the inlet and passing through the strainer to the sediment outlet. This is, of course, accomplished without the necessity of removing the strainer or dismounting any part of the trap, with the exception of the sediment plug, for which a pet-cock or other suitable valve can be substituted, if desired. In the present example, the trap is provided with a usual water gage 20, having upper and lower connections 22 and 24 with the float chamber 10, controlled by usual valves 26 and 28. A usual pet-cock 30 at the upper portion of the trap is provided for venting the float chamber in the customary manner, when desired.

The float chamber 10 is provided with a suitable valve-controlled outlet 32, herein leading into an outlet chamber 34, in the present example formed in a header or cover-plate 36, the latter being suitably attached to the body of the casing, as by bolts 38, and a stud 40, a tight joint being maintained by a usual packing or gasket 42. The outlet from the chamber 30 is by way of a pipe 44 (see Fig. 1). A plug 46 screwed into the header or cover-plate 36 (see Fig. 2) permits access to the outlet chamber 34 and to the valve seat of the valve mechanism now to be described.

The outlet 32 is formed in a valve seat, herein at the inner end of a threaded bushing 48, screwed into a support 50, the latter in turn bing threaded and screwed into the cover-plate 36. The support 50 (see Fig. 4) presents two guides 52 and 54 for a stem 56 of a valve 58, the latter cooperating with the valve seat. The support is provided with one or more, herein six openings 60 (see Fig. 6), providing a way of communication between the float chamber and the outlet therefrom. The support 50 also serves as a mounting for two valve-operating levers 62 and 64 (see Fig. 2), fulcrumed on pivots 66 and 68, respectively, at opposite sides of the axis of the valve 58. One of these levers, herein the upper lever 62, carries a float 70, while the other carries a weight 72 (see Fig. 2).

Both levers are connected to the valve stem 56, as by a pin 74, best shown in Fig. 5, extending through the valve stem and through the slots 76 and provided on opposite sides, respectively, of the support 50, as is best shown in Fig. 4. The pin 74 may be secured to the valve stem by appropriate means, herein a screw 78 (see Fig. 4) extending axially into, and having screw-threaded engagement with the valve stem, the inner end of the screw engaging the central portion of the pin, the latter being preferably provided with a flat spot 80, against which the end of the screw abuts. The levers 62 and 64 are forked, and embrace the support 50, as best shown in Fig. 5, and they are provided with pairs of slots 82 and 84 (see Fig. 5), to receive the terminal portions of the pin 74.

When the trap is empty, or substantially so, the float 70 occupies the position shown in full lines in Fig. 2, and the valve 58 is closed; when, on the other hand the trap is filled, the float occupies the position indicated in dotted lines in Fig. 2, and the levers 62 and 64 occupy the positions shown in Fig. 3, the valve then being open. Upward movement of the float lever may be limited by a suitable stop, herein a lug 86 (see Fig. 2), adapted to engage the support 50. Thus it is evident that the weight 72 assists the float 70 in opening the valve 58, and serves as a species of counterbalance for the latter.

The pressure at which a steam trap can be operated is always limited by the strength of the ball float to resist collapse. If the strength of the float be increased, as by increasing its thickness, its weight will be correspondingly increased. This would ordinarily necessitate either a decrease of the unbalanced pressure area of the valve or an increased leverage (hence a diminished valve opening) to offset the increased weight of the float, and this would decrease the capacity of the trap. My invention contemplates the use of a weighted lever, arranged as a species of counterweight opposed to the weight of the float and float lever, i. e., arranged so that it tends to lift the float, the strength and weight of the float and the corresponding size of the counterweight, naturally being dependent upon the unbalanced pressure area of the valve, and the pressure under which the trap must work. By the proper relation between these factors, the trap can be made to operate at any desired pressure, and have a proper outlet capacity.

Having thus described one embodiment of my invention, but without limiting myself thereto, what I claim and desire to secure by Letters Patent is:

1. In a steam trap, the combination of a casing having a float chamber provided with an inlet and a valve seat presenting an outlet from said chamber, a normally closed, horizontally movable valve cooperating with said seat, a float lever connected to said valve to close the same when the water in said chamber reaches a predetermined minimum level and to open the same when the water rises above such level, and a weighted lever constantly tending to lift said float and to open said valve, said levers cooperating to produce a horizontal thrust to maintain said valve closed when the water does not exceed a predetermined height and to open against the steam pressure when the water rises above such predetermined height.

2. In a steam trap, the combination of a casing having a float chamber provided with an inlet and a valve seat presenting an outlet from said chamber, a horizontally sliding normally closed valve cooperating with said seat, two levers fulcrumed one above and the other below the axis of said valve and connected therewith to slide said valve horizontally along said axis, one of said levers carrying a float and the other presenting a weight constantly tending to lift said float.

3. In a steam trap, the combination of a casing having a float chamber provided with an inlet and a valve seat presenting an outlet from said chamber, an axially sliding valve cooperating with said seat, two levers fulcrumed at opposite sides, respectively of the axis of said valve said levers having long arms extending lengthwise of the axis of said valve and relatively shorter forked arms embracing and connected with said valve to slide the latter along said axis, one of said levers carrying a float and the other presenting a weight constantly tending to lift said float.

In testimony whereof, I have signed my name to this specification.

JOSEPH E. SWENDEMAN.